April 21, 1959  V. J. BRANDT  2,883,081
RETRACTABLE SUPPORT FOR OPERATING CONTROLS
Filed Oct. 14, 1957  3 Sheets-Sheet 1

VERNON J. BRANDT
INVENTOR
HUEBNER, BEEHLER & WORREL
ATTORNEYS
BY Richard M. Worrel

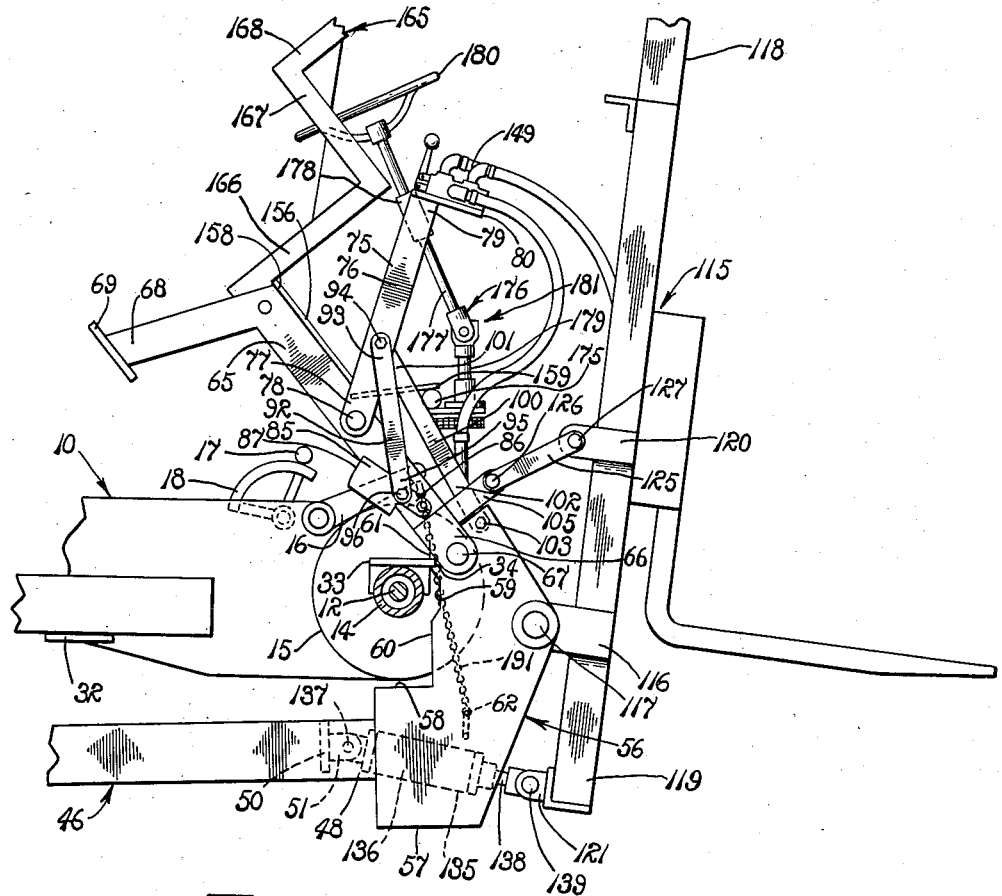

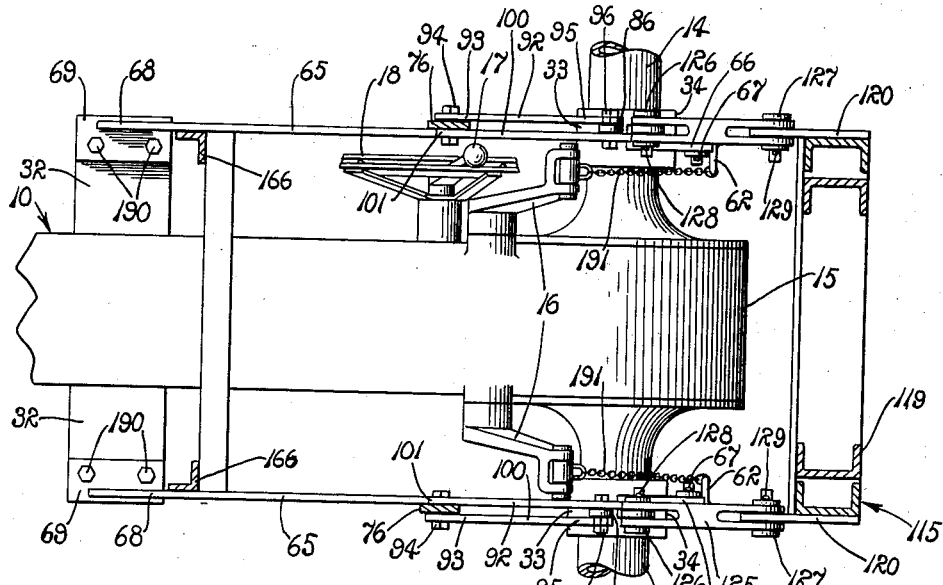
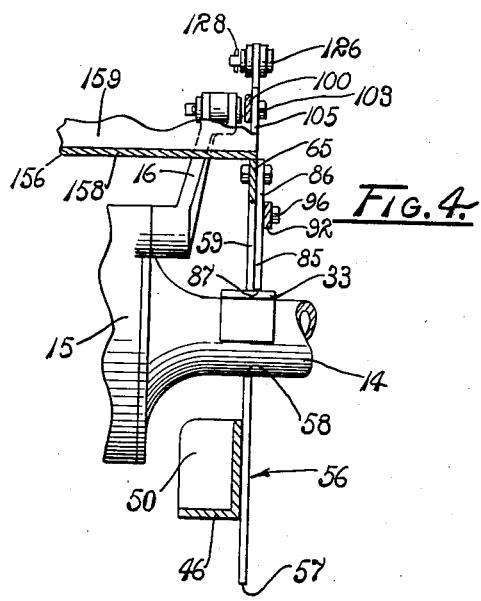

United States Patent Office 2,883,081
Patented Apr. 21, 1959

2,883,081
RETRACTABLE SUPPORT FOR OPERATING CONTROLS

Vernon J. Brandt, Reedley, Calif.

Application October 14, 1957, Serial No. 690,091

7 Claims. (Cl. 214—674)

The present invention relates to a retractable support for operating controls and more particularly, in association with an apparatus for releasably mounting a work tool on a vehicle, to an attachment for supporting operating controls for the work tool and auxiliary operating controls for the vehicle which attachment is releasably automatically connected to the vehicle.

The present application is a continuation-in-part of my prior copending United States patent application Serial No. 562,056 filed January 30, 1956 and entitled Releasable Lift Attachment for Tractors.

In my above cited application and in my other copending application Serial No. 690,105, filed October 14, 1957, there is described an apparatus for quickly mounting a fork lift on a tractor by a one-man operation. Briefly, this apparatus includes an elongated frame extended beneath the tractor having a forward end releasably coupled to the forward end of the tractor and a rear end extended rearwardly and upwardly behind the rear axle housing of the tractor. The fork lift is mounted for forward and rearward tilting movement on the rearwardly extended end of the frame.

Further, elongated arms are pivotally mounted on the extended rear end of the frame for pivotal movement around a horizontal axis between a lower position forwardly extended over the axle housing and an upper retracted position. In the parent structure, a stand is rigidly secured to the arms in spanning relation thereto and supports a plurality of operating controls for the fork lift as well as rigidly supporting an auxiliary steering shaft for the tractor. Further, an auxiliary operator's seat is rigidly secured to the arms so that when the arms are in their lower positions, the steering mechanism is disposed rearwardly adjacent to the seat thereby enabling operation of the tractor and the fork lift from the auxiliary seat while facing rearwardly of the tractor in the direction of the fork lift.

Although these early developments have proved satisfactory in operation, attachment and detachment of the apparatus has proved somewhat difficult because of the described mounting of the operating controls for the tractor and the fork lift. Specifically, it has not been possible to elevate the arms to the desired height for driving the tractor in and out of mounting position because of interference of the operating controls with the fork lift.

Accordingly, it is an object of the present invention to provide a retractable support for the operating controls of a vehicle and a fork lift which is releasably mounted on the vehicle.

Another object is to support operating controls for a vehicle and a work tool releasably mounted thereon which support and controls are movable between an operating position and a compact collapsed or retracted position to enable connection of the apparatus to the vehicle and disconnection therefrom.

Another object is to enable a work tool to be attached to a vehicle and ready for operation in a minimum of time.

Another object is to facilitate movement of a tractor into and out of position for attachment and detachment of a fork lift to and from the tractor.

Another object is to provide a linkage system for supporting operating controls for a vehicle and a work tool mounted thereon which system automatically positions the controls for convenient access by an operator and which is collapsed into a minimum of space.

Another object is to provide an apparatus of the nature described which is easily operated by a single workman.

These, together with other objects, will become more fully apparent upon reference to the following description.

In the drawings:

Fig. 2 is a fragmentary side elevation, partially in section, of the rear end portion of the structure illustrated in Fig. 1 with the mounting apparatus of the present invention in a retracted position.

Fig. 3 is a somewhat enlarged fragmentary horizontal section taken generally on line 3—3 of Fig. 1.

Fig. 4 is a somewhat enlarged fragmentary transverse vertical section taken on line 4—4 in Fig. 1.

Figure 1:
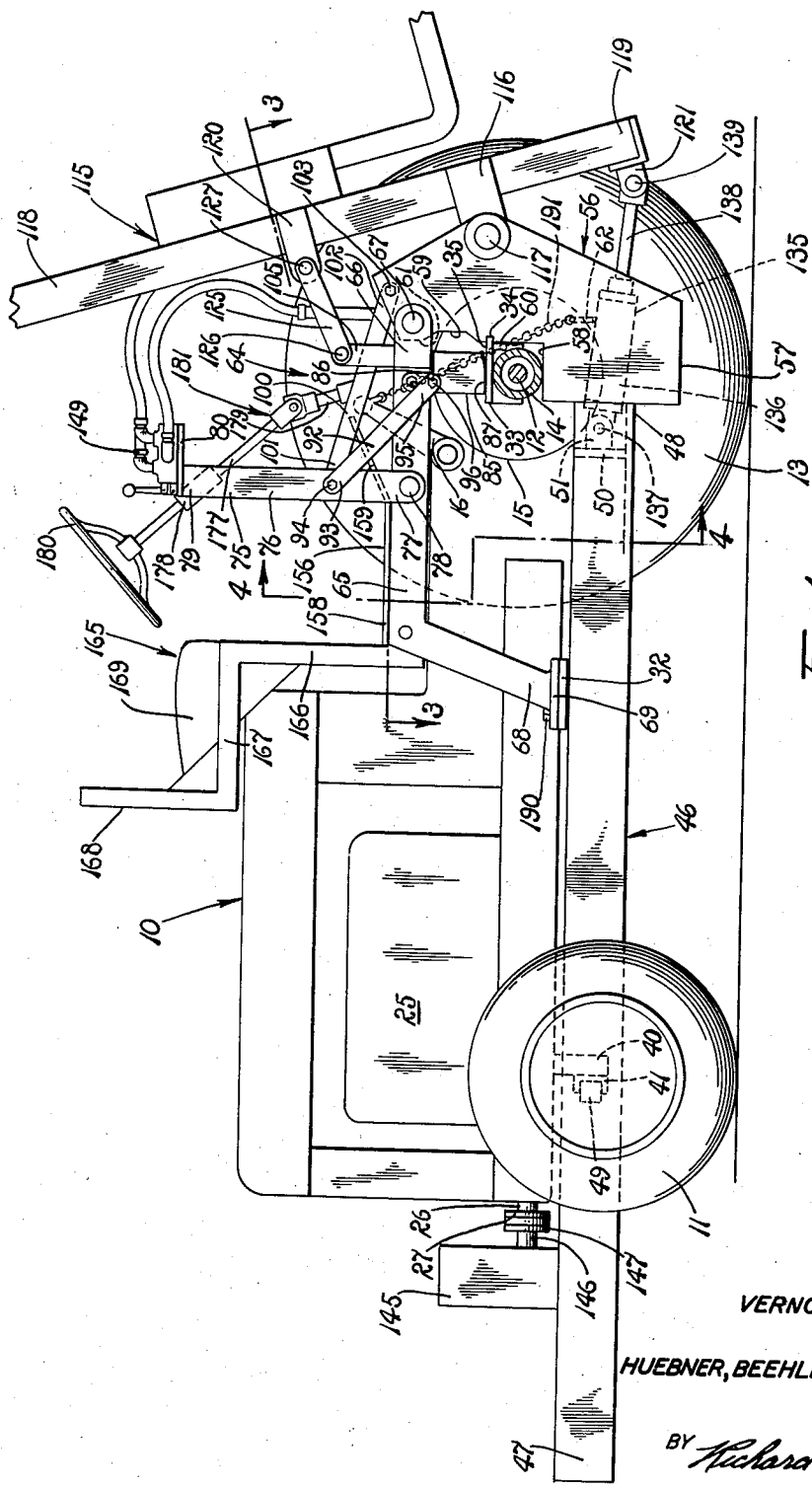
Fig. 1 is a side elevation of a tractor, a fork lift, and a mounting apparatus as constructed in accordance with the principles of the present invention. The mounting apparatus is shown in a position fully attached to the tractor.

Referring more particularly to the drawings, a tractor of conventional form is indicated by the numeral 10 and includes a pair of spaced front wheels 11, a transversely extended substantially horizontal rear axle 12, large rear wheels 13 mounted on opposite ends of the axle, an axle housing 14 circumscribing the rear axle, and a differential housing 15. Hydraulically controlled elevationally adjustable lift arms 16 are mounted on the tractor and are controlled in their elevational movement by a handle 17 movable within a quandrant 18. The lift arms are part of a well-known hydraulic system and are not described in further detail.

The tractor 10 also has an engine 25 providing a forwardly extended crankshaft 26. A coupling 27 is secured to the crankshaft.

With particular reference to Figs. 1 and 3, tractor plates 32 are rigidly connected to the tractor 10 and laterally outwardly extended on opposite sides thereon in substantially horizontal planes. Load bearing blocks 33 are rigidly secured on the top of the rear axle housing 14 on opposite sides of the differential 15. The bearing blocks have rearwardly disposed horizontal edges 34 and substantially horizontal upper surfaces 35.

As best seen in Fig. 1, a plate 40 is downwardly extended underneath the forward end of the tractor 10. A transversely extended, substantially horizontal, forwardly open coupling channel 41 is secured to the dependent plate. For further details in regard to the channel, reference is hereby made to my copending application Serial No. 690,105, filed October 14, 1957.

An elongated substantially rectangular mounting frame 46 is extended in a substantially horizontal plane beneath the tractor 10 and between the front and rear wheels 11 and 13, as best seen in Fig. 1. The frame is thus narrow enough to fit between the wheels but longer than the tractor. The frame has a forwardly extended coupling end 47 and a rearwardly extended tool mounting end 48. An elongated, substantially horizontal, transversely extended coupling bar 49 is mounted in the forward end of the frame and is adapted to be fitted in the channel 41 in the manner described in my above identified copending application. Webs 50 are rigidly secured in the rearward end of the frame on opposite sides thereof, and lugs 51 extended rearwardly from the webs.

The frame 46 also provides transversely spaced upwardly and downwardly extended mounting brackets 56 disposed in vertical planes longitudinally of the tractor 10. Each bracket has a lower ground engaging edge 57, a substantially horizontal abutment edge 58 below the rear axle housing 14 and adapted for engagement therewith, a forwardly facing camming edge 59 slidably engaging the rear edge 34 of the bearing block 33 on its respective side of the differential 15, a lower portion 60, and an upper portion 61. Eyelets 62 are connected to the inside surfaces of the brackets on their lower portions.

A linkage system 64 as provided by the present invention includes elongated, angular arms 65 having rear or outer mounting ends 66 individually pivotally connected to the upper portions 61 of the frame brackets 56 by means of pins 67, and forwardly or inwardly extended, angulated ends 68. Flat arm plates 69 are secured on the forward ends of the arms. The arms are thus mounted on the brackets 56 for elevational pivotal movement around a substantially common horizontal axis between lower frame locking positions with the arm plates in engagement with the tractor plates 32, as seen in Fig. 1, and upwardly retracted positions, as seen in Fig. 2. In the frame locking positions, the rear ends of the arms extend above the load bearing blocks 33 in substantially parallel relation to the longitudinally extended frame members, as will be evident by reference to Fig. 1.

An arched or U-shaped stand 75 provides elongated legs 76 having lower ends 77 pivotally connected by pins 78 intermediate the ends 66 and 68 of the arms 65 for pivotal movement around a substantially horizontal axis, and upwardly extended ends 79. A table 80 rigidly interconnects the upper ends of the legs in transversely spanning relation to the arms.

Rigid detent or camming flaps 85 provide upper ears 86 individually pivotally connected to the rear ends 66 of the arms 65 forwardly of the pivot pins 67, and lower camming edges 87 having convex rear portions, as seen in Fig. 1. The flaps thus are mounted for pivotal movement around horizontal axes.

Elongated rigid flap control links 92 provide forward ends 93 individually pivotally connected to the legs 76 in upwardly spaced relation to the pins 78 by means of horizontal pins 94. The flap control links also have rearwardly extended ends 95 individually pivotally connected to the flaps 85 in downwardly spaced relation to the pivotal connection to the arms 65 by means of horizontal pins 96 parallel to pins 94.

Elongated rigid stand or leg control links 100 provide forward ends 101 individually connected to the legs 76 on the pins 94 and rearwardly extended ends 102 individually pivotally connected to the upper portions 61 of the mounting brackets 56 for vertical pivotal movement by means of pins 103. The pins 103 are rearwardly upwardly spaced from the pins 67, as best seen in Figs. 1 and 2. Rigid posts 105 have lower ends individually rigidly connected to the rear ends 66 of the arms 65 and upwardly extended ends.

A fork lift 115 is partially illustrated in Figs. 1, 2 and 3. The fork provides outwardly extended fulcrum members 116 individually pivotally connected to the mounting brackets 56 adjacent to their rearward edges by substantially horizontal trunnions 117. The fork lift provides an upper portion 118 upwardly extended from the fulcrum members, and a lower portion 119 downwardly extended from the fulcrum members. Upper and lower lugs 120 and 121 are extended from the upper and lower portions, respectively, of the fork.

Relatively short, H-shaped fork connecting links 125 provide forward bifurcated ends individually fitted on opposite sides of the posts 105 and rearward bifurcated ends individually fitted on opposite sides of the upper lugs 120. Bolts 126 and 127 are releasably extended through the opposite ends of the fork connecting links, the posts, and the upper lugs, and cotter pins 128 and 129 are extended transversely through the ends of the bolts.

Hydraulic control rams 135 provide cylinders 136 pivotally connected by pins 137 to the lugs 51 on the frame 46 and rearwardly extended reciprocal piston rods 138 pivotally connected by pins 139 to the lower lugs 121. It will be evident that by expansion of the rams, the fork lift 115 is tilted forwardly in a counterclockwise direction, as viewed in Figs. 1 and 2, around the fulcrum pins 117 and, by contraction of the rams, it is tilted rearwardly in a clockwise direction. The terms "forward" and "rearward" are used in reference to the normal forward direction of the tractor 10 for purposes of consistency although it might seem more appropriate to reverse these designations when referring to the fork lift.

A combined pump and reservoir 145 are mounted on the forward ends 47 of the frame 46, as shown in Fig. 1, and the pump provides an input driven shaft 146 having a coupling 147 thereon releasably connected to the output coupling 27 on the crankshaft 26. Hydraulic controls 149 are mounted on the table 80 of the stand 75 and have suitable connection to the pump, the rams 65, and the fork lift 115 as well as to the hydraulic lift control system of the tractor. The details of the hydraulic system and control are fully described in my above identified prior copending application. Inasmuch as they form no specific part of the present invention, they are not described in any further detail.

A floor board 156 includes a forward panel 158 rigidly interconnecting the arms 65 adjacent to the juncture of their forward and rearward ends 68 and 66. A rear floor board panel 159, separable from the forward panel, has opposite side edges rigidly secured to and interconnecting the legs 76 of the stand 75 in upwardly acute angular relation to the legs. The front and rear panels provide adjacent edges extended transversely of the tractor 10 which are in substantial abutment when the arms are in their lower positions but which are in vertically spaced relation when the arms are retracted. Further, when the arms are lowered, the front panel is horizontal while the rear panel extends rearwardly upwardly from the front panel.

A seat 165 includes a lower portion 166 rigidly secured to the arms 65 forwardly adjacent to the front floor board panel 158, an open cushion-receiving body supporting portion 167 perpendicular to the lower portion, and an upper back rest 168 perpendicular to the body receiving portion. A seat cushion 169 is removably received in the body supporting portion. Prior to retracting the arms 65, the seat cushion is removed for a purpose to be described.

A bracket 175 is rigidly secured adjacent to the rear edge of the rear floor board panel 159. An elongated steering shaft 176 includes an upper portion 177 rotatably mounted in a bearing 178 rigidly supported on the stand 75 below the table 80. The steering shaft also has a lower end portion 179 rotatably mounted in the bracket and universally connected to the upper end portion. Inasmuch as the drive connection between the steering shaft and the front wheels 11 of the tractor forms no specific part of the present invention, it is not described in detail. However, a suitable arrangement is that shown in my above cited parent patent application. A steering wheel 180 is secured to the upper end of the steering shaft so as to be positioned rearwardly of the seat 165. The steering shaft and wheel together constitute a steering mechanism generally indicated by the numeral 181. When the arms 65 are retracted, as in Fig. 2, the steering wheel is received into the open body supporting portion 167 of the seat so as to fold the operating control supporting structure into a minimum of space.

Elongated flexible chains 191 provide lower ends connected to the eyelets 62 on the mounting brackets 56 and upper ends connected to the lift arms 16 of the tractor 10. Bolts 190 are provided for interconnecting the tractor arm plates 32 and 69 when the arms 65 are in frame locking positions.

Operation

The operation of the described embodiment of the subject invention is believed to be readily apparent and is briefly summarized at this point. Initially the tractor 10 is backed up over the frame 46, which is rested on the ground, with the front and rear wheels 11 and 13 straddling the frame. Thereafter, when the tractor and frame are in relatively proper positions, the normal tractor seat and steering wheel, neither of which are shown, are removed.

The frame 46 is then drawn upwardly against the tractor 10 with the rod 49 coupled to the channel 41, and with the abutment edges 58 of the mounting brackets 56 in closely spaced relation to, or actually engaged with, the underside of the axle housing 14. The chains 191 are forwardly upwardly extended, and the lift arms 16 are in their upper positions. The manner in which the frame is placed into this position is fully described in both of my copending applications previously referred to. For the purpose of the present invention, the operation will be considered in detail after the frame has been moved up against the tractor into a substantially horizontal position, as shown in Fig, 1, At this time, however, the linkage system 64 is in its upwardly retracted position and the fork lift 115 is tilted rearwardly, as shown in Fig. 2.

In order to lower the linkage system 64, the rams 135 are extended thereby to tilt the fork lift forwardly around the fulcrum pins 117. Through the upper lugs 120, the links 125, and the posts 105, the linkage system is pivoted downwardly toward frame locking position. As the arms 65 move in a counterclockwise direction, as viewed in Fig. 2, the stand control links 100 pivot the stand in a clockwise direction, as viewed in Fig. 2. This movement of the stand shoves downwardly on the flap control links 85 to pivot the latter in a counterclockwise direction. Thus the camming edges 87 of the flaps are brought into engagement with the upper surfaces 35 of the load bearing blocks 33.

The bolts 190 are extended through the plates 32 and 69 to hold the arms 65 in frame locking positions. It is to be noted that the stand 75 is in upright position on the arms, the cushion receiving portion 167 is in horizontal position above the tractor 10 and faces rearwardly, the steering mechanism 181 is located rearwardly of the seat, the adjacent rear and front edges of the floor board panels 158 and 159 are in substantial abutment, the rear panel is horizontal below the seat, and the front panel extends rearwardly upwardly from the rear panel.

The fork connecting links 125 are detached either from the posts 105 or the lugs 120 by taking out bolts 126 and/or 127. Thereupon, the rams 135 are contracted to tilt the fork lift 115 into an upright position of operation. After inserting the cushion 169 in the cushion receiving portion 167 of the seat 165, an operator can sit on the cushion, rest his feet on the floor board 156, and control both the fork lift 115 and tractor 10 by means of the steering mechanism 181, and the hydraulic controls 149. In this regard, it is to be understood that suitable connections are made between the drive mechanism of the tractor 10, not shown, and auxiliary operating controls, not fully shown but including the steering mechanism, mounted on the linkage system 64. These specific auxiliary controls form no specific part of the present invention.

In order to detach the mounting apparatus, the fork lift 115 is first tilted forwardly and the connecting links 125 reconnected between the posts 105 and the upper lugs 120. After removing the bolts 190, disconnecting the auxiliary controls from the tractor drive mechanism, and removing the cushion 169 from the seat 165, the rams are retracted and the linkage system pivoted upwardly in a manner believed readily apparent. It will be evident that the fork lift constitutes a linkage or cam positioning member since it controls the position of the cam flaps 85. As best seen in Fig. 2, the seat 165, stand 75, steering mechanism 181 and control links 92 and 100 collapse in jack knife fashion as the arms 65 retract thereby resulting in a very compact arrangement. Inasmuch as the stand jack knifes toward the arms as the arms rise, neither the stand nor the steering mechanism attached thereto interfere with or strike the fork lift 115. Accordingly, the linkage can be raised much higher than heretofore. This facilitates, simplifies, and speeds connection and disconnection of the entire apparatus to and from the tractor 10.

The linkage system 64 of the present invention is automatic in operation and constitutes one of the reasons why the mounting apparatus is so easily and rapidly attached to a tractor. The use of this linkage system in connection with the mounting frame extended underneath the tractor enables attachment of a fork lift weighing in the neighborhood of 2,500 pounds onto the tractor in the matter of a few minutes and by one man. In fact, a farmer can change from the mounting of a disc harrow or other earthworking implement to the fork lift and back again in less than one half hour with only moderate skill. This is in contrast to methods employed prior to my subject inventions and utilizing hoisting equipment which required as much as a half of a day and several workmen to accomplish the same results.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a vehicle having a horizontal axle and a frame borne by the vehicle having an extended portion on one side of the axle and adapted to carry a work tool outwardly of the vehicle in laterally spaced relation to the axle, an attachment for supporting an operator's station on the vehicle comprising an arm having a mounting portion and an extended portion, said mounting portion being pivotally connected to the extended portion of the frame for movement of the arm around a horizontal axis transversely of the tractor between a lower position with the extended portion of the arm substantially horizontally extended over the axle and a position upwardly retracted therefrom; a control stand including a leg having a lower end pivotally connected to the arm and an upper end; and a table connected to the upper end of the leg and adapted to support operating controls for the tool; and a stand control link pivotally interconnecting the leg and the extended portion of the frame for pivoting the leg between a position substantially perpendicular to the arm when the arm is in its lower position and a position in acute angular relation to said extended portion of the arm when the arm is retracted.

2. In combination with a vehicle having a horizontal axle and a frame borne by the vehicle having an extended portion on one side of the axle and adapted to carry a work tool outwardly of the vehicle in laterally spaced relation to the axle, an attachment for supporting an operator's station on the vehicle comprising an arm having an outer portion pivotally connected to the extended portion of the frame and an inner portion, the arm being pivotally mounted for movement around a horizontal axis transversely of the tractor between a lower position with said inner portion substantially horizontally extended over the axle and a position upwardly retracted therefrom; a control stand including a leg having a lower end pivotally connected to the arm and an upper end, and a table rigidly connected to the upper end of the leg and adapted to support operating controls for the tool; a stand control link pivotally interconnecting the leg and the extended portion of the frame for pivoting the leg between a position substantially perpendicular to the arm when the arm is in its lower position and a position in acute angular relation to said inner portion of the arm when arm is retracted; a seat rigidly upwardly extended from the arm forwardly of the stand; a floor board panel rigidly connected to the leg of the stand, and extended transversely of the arm; a mounting bracket borne by the panel; a steering shaft having lower and upper end portions respectively rotatably mounted in the bracket and on the stand; and a steering wheel secured to the steering shaft and movable with the stand between a lower operating position in rearwardly spaced relation to the seat when the arm is in its lower position and an upper non-operating position folded up adjacent to the seat when the arm is retracted.

3. In combination with a vehicle having a horizontal axle and a frame borne by the vehicle having an extended portion on one side of the axle and adapted to carry a work tool outwardly of the vehicle in laterally spaced relation to the axle, an attachment for supporting an operator's station on the vehicle comprising an arm having an outer portion pivotally connected to the extended portion of the frame and an inner portion, the arm being pivotally mounted for movement around a horizontal axis transversely of the tractor between a lower position with said inner portion substantially horizontally extended over the axle and a position upwardly retracted therefrom; an auxiliary operator's seat having a lower vertical portion rigidly upwardly extended from the arm in right angular relation to the arm, a horizontal open cushion-receiving portion, and a back portion upwardly extended from the cushion-receiving portion; a control stand including a leg having a lower end pivotally connected to the arm and an upper end, and a table rigidly connected to the upper end of the leg and adapted to support operating controls for the tool; a stand control link pivotally interconnecting the leg and the extended portion of the frame for pivoting the leg between a position substantially perpendicular to the arm when the arm is in its lower position and a position in acute angular relation to said inner portion of the arm when the arm is retracted; a floor board panel rigidly connected to the leg of the stand, and extended transversely of the arm; a mounting bracket secured to and underneath the panel; a steering shaft having lower and upper end portions respectively rotatably mounted in the bracket and on the stand below the table; and a steering wheel secured to the steering shaft and movable with the stand between a lower operating position rearwardly of the seat when the arm is in its lower position and an upper non-operating position folded inwardly toward and extended through the cushion-receiving portion of the seat when the arm is retracted.

4. In combination with a vehicle adapted for earth traversing movement in predetermined forward and rearward directions and having a rear axle; a mounting frame extended upwardly behind the rear axle and adapted to mount a work tool; a retractable support and an auxiliary operator's station comprising an elongated arm having a rearward end portion pivotally connected to the extended portion of the frame for movement around a horizontal axis transversely of the direction of movement of the vehicle between a lower position forwardly extended over the rear axle and a position upwardly retracted therefrom; means releasably connecting the arm to the tractor in said lower position; an auxiliary operator's seat secured to the arm having an open body supporting portion adapted to be in a substantially horizontal position when the arm is in its lower position; a control stand including a leg having a lower end pivotally connected to the arm rearwardly of the seat and an upper end, and a table rigidly connected to the upper end of the leg adapted to support operating controls for the work tool; a stand control link pivotally interconnecting the leg and the extended portion of the frame for pivoting the leg between a position substantially perpendicular to the arm rearwardly of the seat when the arm is in its lower position and a forwardly folded position in relation to the arm when the arm is retracted; a floor board panel rigidly connected to the leg and extended inwardly of the vehicle rearwardly of the seat; a mounting bracket borne by the panel; a steering shaft having lower and upper end portions respectively rotatably mounted in the bracket and on the stand below the table; and a steering wheel secured to the steering shaft and movable with the stand into interfitted relation with the open body supporting portion of the seat when the arm is retracted and into a position rearwardly of the seat when the arm is in its lower position.

5. In combination with a tractor adapted for earth traversing movement in predetermined forward and rearward directions, having a rear axle and normally having main operating controls operable from a driver's seat facing forwardly of the tractor; a mounting frame connected underneath the tractor having portions extended upwardly behind the rear axle in spaced parallel relation transversely of the tractor; and a fork lift mounted on the extended portions of the frame for forward and rearward tilting movement around a horizontal axis; a retractable support for an auxiliary operator's station comprising a pair of elongated angulated arms having rearward end portions individually pivotally connected to the extended portions of the frame for movement of the arms around a horizontal axis transversely of the tractor between lower positions with the rearward end portions substantially horizontally forwardly extended over the rear axle and positions rearwardly upwardly retracted therefrom, the arms also having forward end portions downwardly extended from the rearward end portions in said lower positions; means releasably connecting the forward end portions of the arms to the tractor in said lower positions; an auxiliary operator's seat having a lower vertical portion rigidly upwardly extended from the arms adjacent to the juncture of said forward and rearward end portions and in right angular relation to said rearward end portions, a horizontal open cushion-receiving portion, and a back portion upwardly extended from the cushion-receiving portion; a seat cushion releasably fitted in the cushion-receiving portion of the seat; a control stand including a pair of legs having lower ends individually pivotally connected to the forward end portions of the arms rearwardly of the seat and upper ends, and a table rigidly interconnecting the upper ends of the legs and adapted to support operating controls for the fork lift; a pair of stand control links individually pivotally interconnecting the legs and the extended portions of the frame for pivoting the legs between positions substantially perpendicular to the rearward end portions of the arms and rearwardly of the auxiliary seat when the arms are in their lower positions and positions in forwardly acute angular relation to said forward end portions when the arms are retracted; a front floor board panel rigidly interconnecting the forward end portions of the arms, extended transversely of the arms rearwardly of and immediately below the auxiliary seat, and having a rear edge extended transversely of the arms; a rear floor board panel rigidly interconnecting the legs of the stand, extended transversely of the arms, and having a front edge extended transversely of the arms, the rear panel being movable with the legs between a position rearwardly upwardly extended in obtuse angular relation to the front panel with said front edge substantially in abutment with the rear edge of the front panel when the arms are in their lower positions and a position spaced from the forward panel when the arms are retracted; a mounting bracket secured to and underneath the rear panel; a steering shaft having lower and upper end portions respectively rotatably mounted in the bracket and on the stand below the table; a steering wheel secured to the steering shaft and movable with the stand between a lower operating position rearwardly above the seat when the arms are in their lower positions and an upper non-operating position extended through the cushion-receiving portion of the seat when the cushion is removed and the arms are retracted; a linkage pivotally interconnecting the fork lift above its pivot axis; and powered means pivotally interconnecting the frame and the fork lift below its pivot axis and being extendible and contractible to tilt the fork lift and thereby to pivot the arms between their lower and retracted positions.

6. In combination with a vehicle having a horizontal axle and a frame borne by the vehicle having an extended portion on one side of the axle and adapted to carry a work tool outwardly of the vehicle in laterally spaced relation to the axle, an attachment for supporting an operator's station on the vehicle comprising an arm having a mounting portion and an oppositely extended portion, said mounting portion being pivotally connected to the extended portion of the frame for movement of the arm around a horizontal axis transversely of the tractor between a lower position with the extended portion of the arm substantially horizontally extended over the axle and a position upwardly retracted therefrom; a control stand including a leg having a lower end pivotally connected to the arm and an upper end adapted to support operating controls for the tool; and a stand control link pivotally interconnecting the leg and the extended portion of the frame for pivoting the leg between a position substantially perpendicular to the arm when the arm is in its lower position and a position in acute angular relation to said oppositely extended portion of the arm when the arm is retracted between positions in angular relation with the arm when the arm is in its lower and retracted positions, the leg and the oppositely extended portion of the arm being in acute angular relation when the arm is retracted and the angle between the leg and the oppositely extended portion of the arm when the arm is in said lower position being greater than the angle between the leg and said oppositely extended portion in said retracted position of the arm.

7. In combination with a tractor having forward and rearward end portions and providing a rear axle, and a frame borne by the tractor adapted to carry a work tool rearwardly of the tractor, said frame being forwardly extended beneath the rear axle of the tractor; an attachment for supporting an operator's station on the tractor comprising an arm pivotally connected to the frame rearwardly of the axle and forwardly extended therefrom over the axle for movement betweeen a substantially horizontal position supporting the frame on the axle and a position upwardly retracted therefrom; a stand pivotally connected to the arm and upwardly extended therefrom; and a control link pivotally interconnecting the stand and the frame at a position rearwardly of the arm for pivoting the stand between an upwardly extended position when the arm is in its substantially horizontal position, with a predetermined angle being defined between said stand and the forwardly extended end of the arm, and a position angled relatively toward the extended end of the arm with reduced angularity between the stand and the extended end of the arm when the arm is retracted.

No references cited.